(12) United States Patent
Jang

(10) Patent No.: US 7,839,377 B2
(45) Date of Patent: Nov. 23, 2010

(54) APPARATUS AND METHOD FOR DRIVING A LAMP OF A LIQUID CRYSTAL DISPLAY DEVICE

(75) Inventor: Hoon Jang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1191 days.

(21) Appl. No.: 11/455,760

(22) Filed: Jun. 20, 2006

(65) Prior Publication Data

US 2007/0097288 A1 May 3, 2007

(30) Foreign Application Priority Data

Oct. 27, 2005 (KR) .................. 10-2005-0101868

(51) Int. Cl.
- G09G 3/36 (2006.01)
- G02F 1/1335 (2006.01)
- G09F 13/04 (2006.01)
- G09F 13/08 (2006.01)

(52) U.S. Cl. .................. 345/102; 349/62; 362/97.2

(58) Field of Classification Search .................. 345/102, 345/31, 108; 362/97.1–97.3; 349/61

See application file for complete search history.

(56) References Cited

U.S. PATENT DOCUMENTS

| | | | |
|---|---|---|---|
| 2003/0234762 A1* | 12/2003 | Nakatsuka et al. | 345/102 |
| 2005/0111237 A1* | 5/2005 | Moon et al. | 362/561 |
| 2006/0279516 A1* | 12/2006 | Yun | 345/102 |

* cited by examiner

Primary Examiner—Bipin Shalwala
Assistant Examiner—Ilana Spar
(74) Attorney, Agent, or Firm—McKenna Long & Aldridge

(57) ABSTRACT

This invention relates to an apparatus and method for driving a lamp of a liquid crystal display device that applies a scanning backlight driving to an external electrode fluorescent lamp.

A lamp driving apparatus of a liquid crystal display device, including: a plurality of lamps irradiating light to a liquid crystal display panel and including external electrodes; a common electrode connected to the external electrodes that supply a tube current to the lamps; auxiliary electrodes that are movable; and an auxiliary electrode driving part sequentially connecting the auxiliary electrodes with and disconnecting the auxiliary electrode from the external electrodes in accordance with a scan direction of data to be displayed on the liquid crystal display panel.

11 Claims, 10 Drawing Sheets

APPARATUS AND METHOD FOR DRIVING A LAMP OF A LIQUID CRYSTAL DISPLAY DEVICE

This application claims the benefit of Korean Patent Application No. P2005-0101868, filed on Oct. 27, 2005, which is hereby incorporated by reference for all purposes as if fully set forth herein.

BACKGROUND OF THE INVENTION

1. Field of the Invention

The present invention relates to a liquid crystal display device, and more particularly to an apparatus and method for driving a lamp of a liquid crystal display device that may apply a scanning backlight driving to an external electrode fluorescent lamp.

2. Discussion of the Related Art

Liquid crystal display devices have numerous applications and this is an every-increasing trend due to characteristics such as lightness, thinness, low driving power consumption, and other factors. According to this trend, liquid crystal display devices may be used in office automation equipment, audio/video equipment, and other devices. The liquid crystal display device controls the amount of light transmitted in accordance with a signal applied to a plurality of control switches which may be arranged in a matrix shape, and thus a desired picture is displayed on a screen.

The liquid crystal display device is not a self luminous display device, rather it requires a separate light source such as a backlight.

Backlights may be classified into either a direct type or an edge type according to the location of a light source. The edge type backlight has a light source installed at the edge of one side of a liquid crystal display device, and irradiates light from the light source to a liquid crystal display panel through a light guide panel and a plurality of optical sheets. The direct type backlight has a plurality of light sources disposed right under the liquid crystal display device, and irradiates light from light sources to the liquid crystal display panel through a diffusion plate and a plurality of optical sheets.

Recently, in the direct type backlight, of which brightness, light uniformity and color purity are greater than those of the edge type backlight, is more often used in the case of an LCD TV.

FIG. 1 is a diagram representing a liquid crystal display device of the related art to which a direct type backlight may be applied.

Referring to FIG. 1, the liquid crystal display device of the related art includes a liquid crystal display panel 11 for displaying images and a backlight unit 10 for irradiating light to the liquid crystal display panel 11.

In the liquid crystal display panel 11, a plurality of data lines and a plurality of gate lines are arranged to cross each other (not shown), and liquid crystal cells are arranged in an active matrix type between upper and lower substrates (not shown). Further, in the liquid crystal display panel, there are formed pixel electrodes and a common electrode for applying an electric field to each of the liquid crystal cells (not shown). Thin film transistors, for switching a data voltage which is to be applied to the pixel electrode in response to a scan signal, may be formed at crossings or the data and gate lines. In such a liquid crystal display panel, gate driver integrated circuits and data driver integrated circuits may be electrically connected through a tape carrier package TCP.

The backlight unit 10 further may include a plurality of lamps 15, a bottom cover 12, a diffusion plate 13, and a plurality of optical sheets 14.

The lamps 15 emit light by an AC high voltage from an inverter (not shown) to generate light to a diffusion plate 13.

The bottom cover 12 may be made as a container structure wherein a plurality of lamps 15 may be housed, and a reflection plate may be formed in bottom and side surfaces of an inner space of the bottom cover 120.

The diffusion plate 13 may be assembled with the bottom cover 12. The diffusion plate 13 may include a plurality of beads and disperses light incident from the lamps 15 by use of the beads such that no brightness difference between locations of the lamps 15 and locations between the lamps in the display surface of the liquid crystal display panel 11 exists. The diffusion plate 13 may be structured where the beads are scattered in a medium having the same refractive index, so that light can not be condensed.

The optical sheets 14 may include one or more diffusion sheets and one or more prism sheets, and irradiate the incident light from the diffusion plate 13 to the entire liquid crystal display panel 11 and bend a path of light in a substantially vertical direction to the display surface, thereby condensing the light to the front surface of the display surface.

The lamp 15 may be a cold cathode fluorescent lamp CCFL, an external electrode fluorescent lamp EEFL, or a light emitting diode LED.

The cold cathode fluorescent lamp, as shown in related art FIG. 2, may have inverters I1 to In connected to lamps L1 to Ln respectively, and can be independently driven for each lamp L1 to Ln by each inverter I1 to In. Accordingly, it is possible to apply a scanning backlight driving where the lamps are sequentially turned on/off such that motion blurring is reduced.

FIGS. 3 and 4 are related art diagrams briefly representing a scanning backlight as functions or voltage, frame and time.

Referring to FIG. 3, if a drive voltage of a liquid crystal cell is about 30V in the previous frame and a drive voltage of the current frame is about 80V, the voltage slowly increases in a curve shape as illustrated in FIG. 3 until it reaches a desired value. In order to reduce heat generation caused by the backlight, to decrease motion blurring, and to increase efficiency of the backlight, the lamp is not continuously turned on for the entire time of the current frame, but the lamp is maintained in an off state for a fixed time from the time when the current frame starts and is turned on for the remaining time.

Referring to FIG. 4, the turn-on time of each lamp may be controlled in an order of the lamps according to FIG. 3. If a gate signal is sequentially supplied to each gate line in the liquid crystal display panel, the lamp corresponding to the gate line to which the gate signal is supplied, as a result, the lamps are sequentially turned on.

The external electrode fluorescent lamp realizes a high brightness. The external electrode fluorescent lamp has an electrode located at the outside which differs from the cold cathode fluorescent lamp where the electrode is located inside the lamp, thus the lamps are generally operated in parallel to reduce a voltage deviation between the lamps. Thus, the external electrode fluorescent lamp is highly energy efficient and has a long life span as well uniform brightness, thereby the external electrode fluorescent lamp is preferred.

However, the external electrode fluorescent lamp differs from the cold cathode fluorescent lamp, as shown in related art FIG. 5, and is driven by a parallel driving where an external electrode 22 connected to both ends of a lamp 21 with a common electrode 23 is disposed and an inverter 24 is connected to the common electrode 23, making it almost impossible to drive the lamp independently such that scanning backlight driving cannot be accomplished.

SUMMARY OF THE INVENTION

Accordingly, the present invention is directed to an apparatus and method for driving a lamp of a liquid crystal display device that substantially obviates one or more of the problems due to limitations and disadvantages of the related art.

An advantage of the present invention is to provide an apparatus and method for driving a lamp of a liquid crystal display device that applies scanning backlight driving to an external electrode fluorescent lamp.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a lamp driving apparatus of a liquid crystal display device, including: a plurality of lamps irradiating light to a liquid crystal display panel and including external electrodes; a common electrode connected to the external electrodes that supply a tube current to the lamps; auxiliary electrodes that are movable; and an auxiliary electrode driving part sequentially connecting the auxiliary electrodes with and disconnecting the auxiliary electrode from the external electrodes in accordance with a scan direction of data to be displayed on the liquid crystal display panel.

In another aspect of the present invention, a lamp driving method of a liquid crystal display device, including: installing auxiliary electrodes that are able to be connected to and disconnected from a plurality of external electrodes; irradiating light to a liquid crystal display panel by applying a tube current to a plurality of lamps through the external electrodes; and sequentially connecting the auxiliary electrodes to and disconnecting the auxiliary electrodes from the external electrodes by driving the auxiliary electrodes in conjunction with a scanning direction of the liquid crystal display panel.

It is to be understood that both the foregoing general description and the following detailed description are exemplary and explanatory and are intended to provide further explanation of the invention as claimed.

BRIEF DESCRIPTION OF THE DRAWINGS

These and other objects of the invention will be apparent from the following detailed description of the embodiments of the present invention with reference to the. accompanying drawings, in which.

DETAILED DESCRIPTION OF THE ILLUSTRATED EMBODIMENTS

Reference will now be made in detail to the preferred embodiments of the present invention, examples of which are illustrated in the accompanying drawings.

With reference to FIGS. 6 to 9, embodiments of the present invention will be explained as follows.

Figure 1:
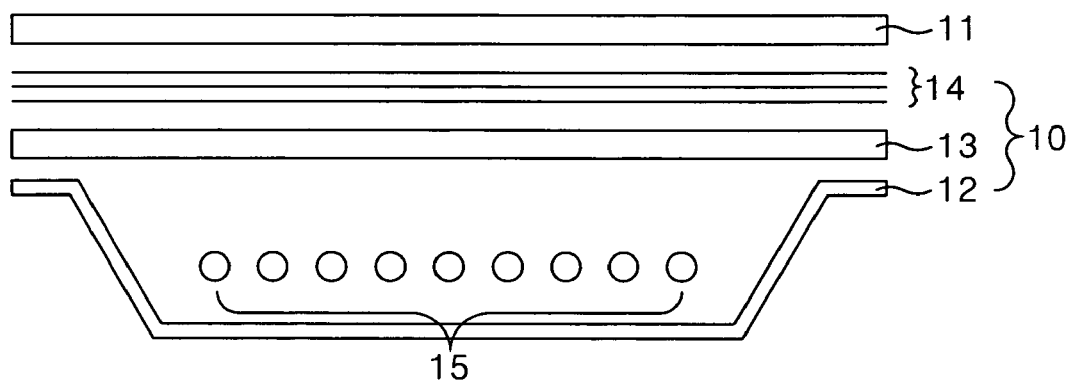
FIG. 1 is a diagram representing a direct type backlight unit of the related art.
Figure 2:
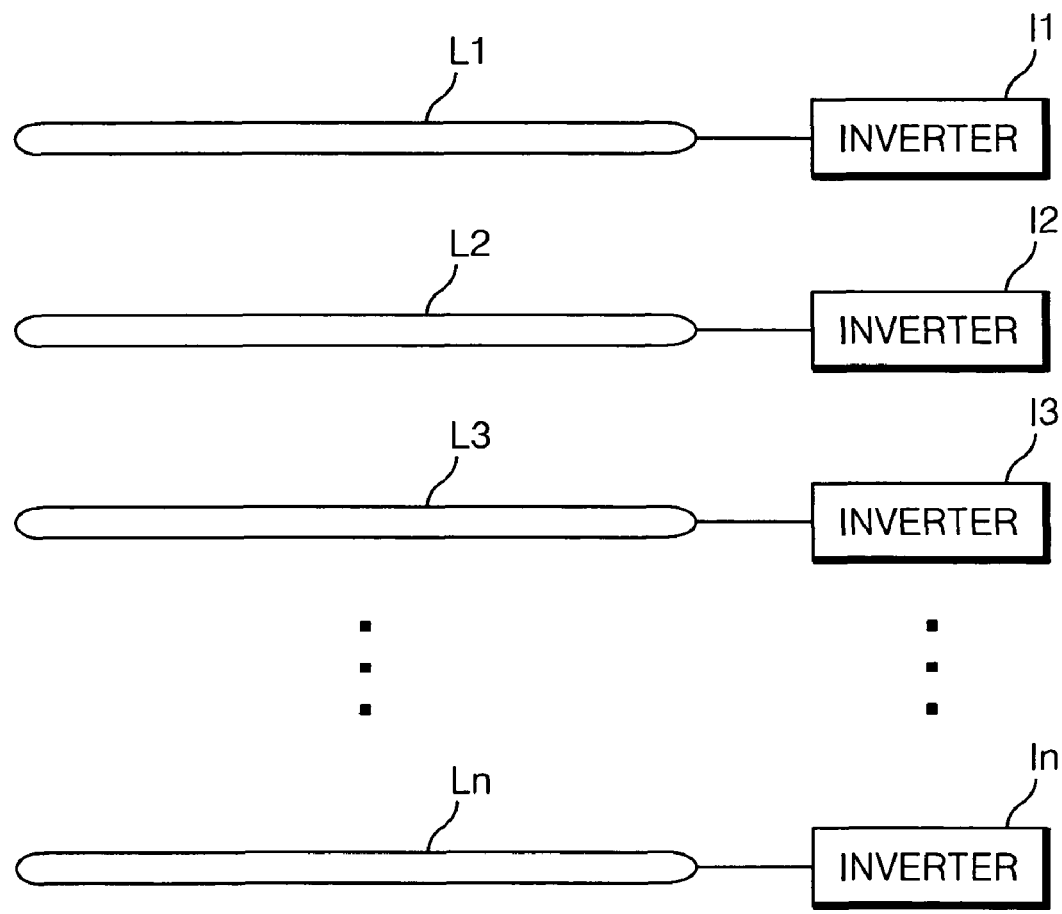
FIG. 2 is a diagram representing a general cold cathode fluorescent lamp.
Figure 3:
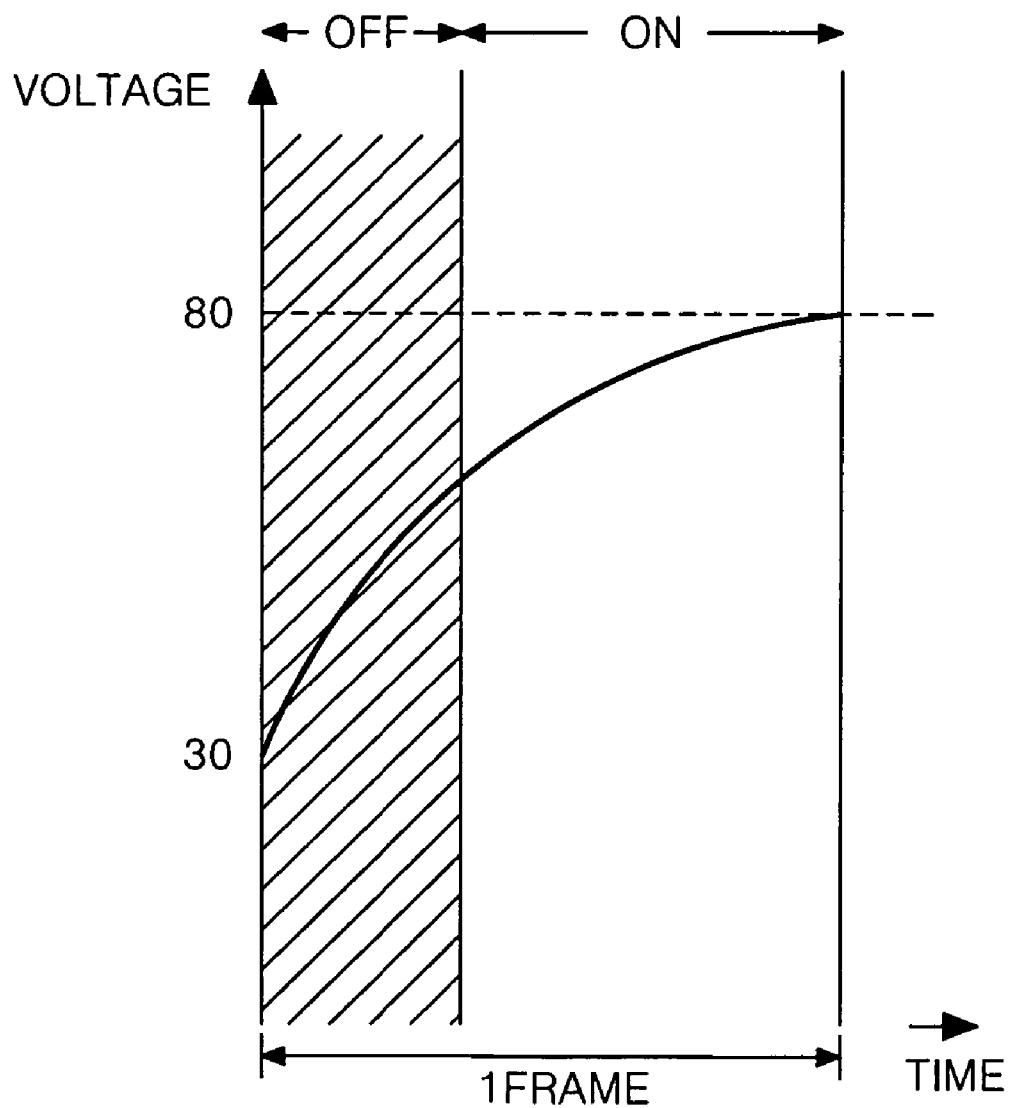
FIGS. 3 and 4 are diagrams representing a scanning sequence for a backlight with a cold cathode fluorescent lamp.
Figure 4:
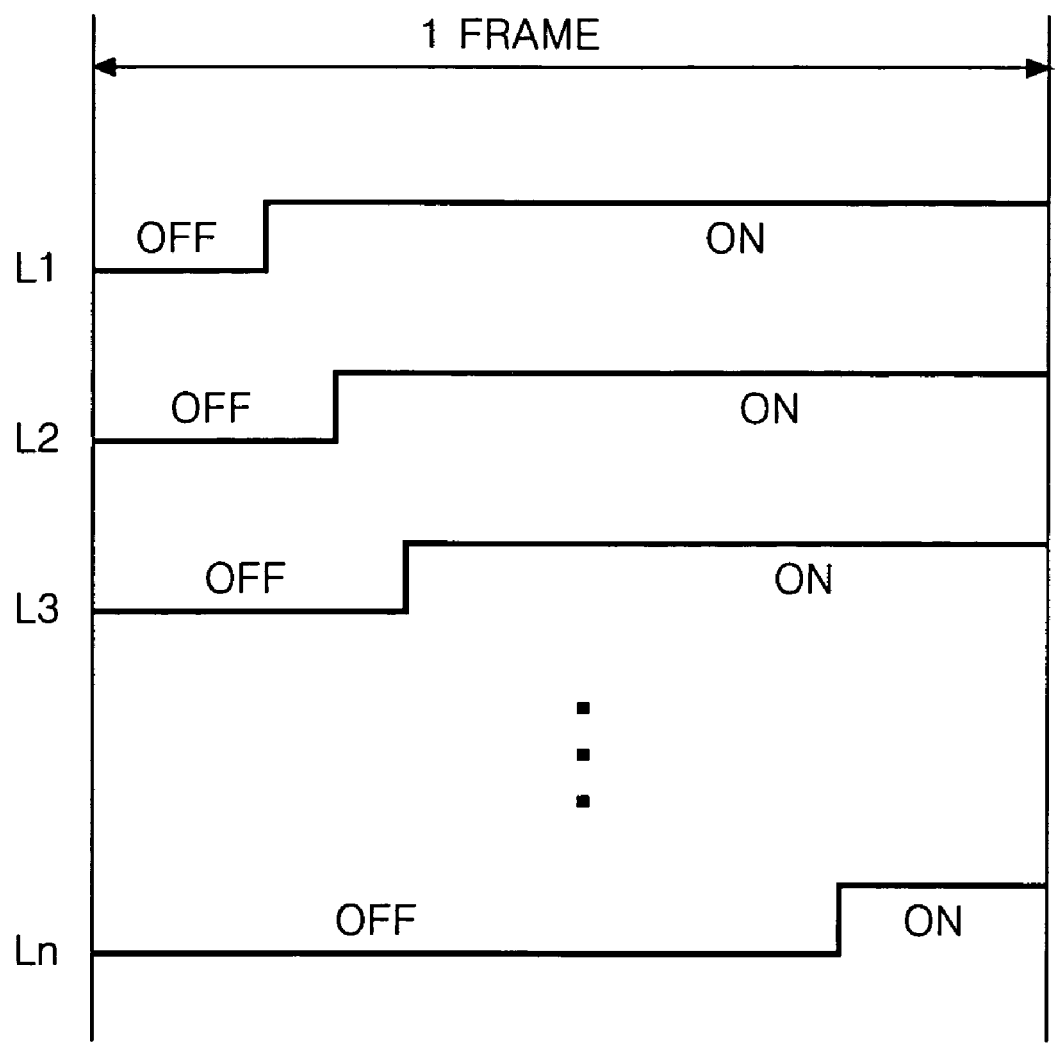
Figure 5:
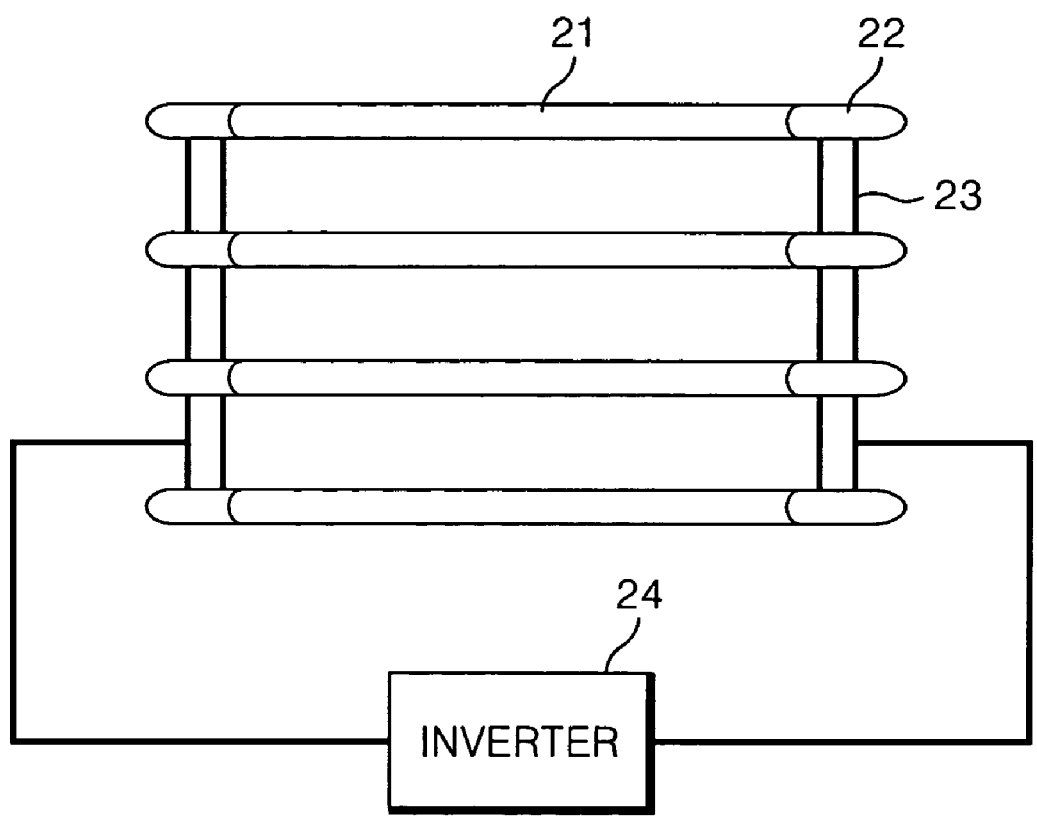
FIG. 5 is a diagram representing an EEFL backlight unit of the related art.
Figure 6:
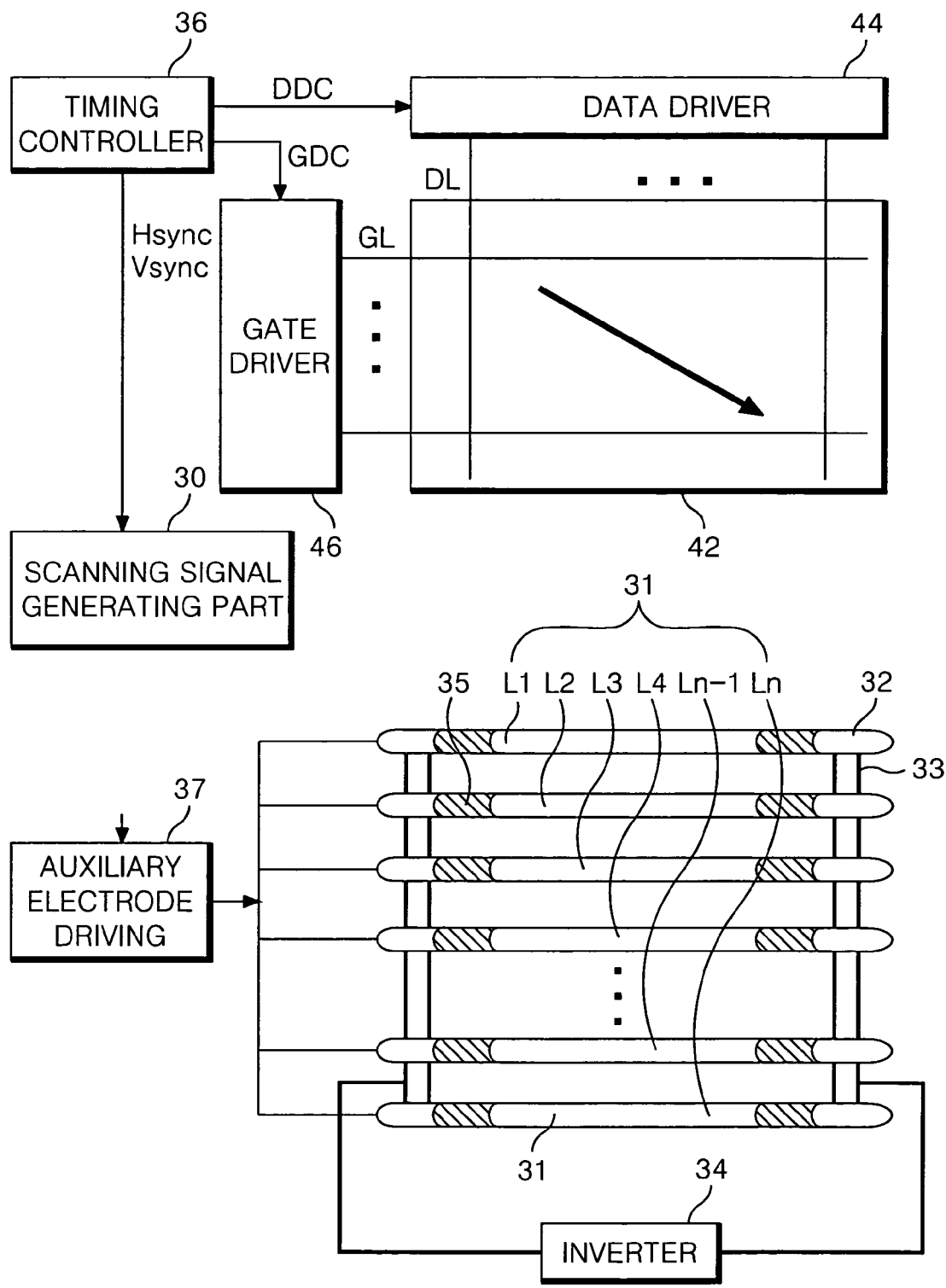
FIG. 6 is a diagram representing a lamp driving apparatus of a liquid crystal display device according to the present invention.

FIG. 6 is a diagram briefly representing a lamp driving apparatus of a liquid crystal display device according to an embodiment of the present invention.

The liquid crystal display device shown in FIG. 6 includes: a liquid crystal display panel 42 where data lines DL and gate lines GL cross each other and TFT's are formed at the crossings; a data driver 44 for supplying data to the data line of the liquid crystal display panel 42; a gate driver 46 for supplying a scan signal to the gate line of the liquid crystal display panel 42; and a timing controller 36. The liquid crystal display device further includes a lamp driving apparatus located under the liquid crystal display panel 42 for irradiating light to the liquid crystal display panel 42.

Referring to FIG. 6, the lamp driving apparatus according to the embodiment of the present invention includes: a lamp 31 including of an external electrode 32; a common electrode 33 connected to the external electrode 32; an inverter 34 connected to the common electrode 33 for supplying a static current; and an auxiliary electrode 35 that may be combined and removed so as to be connected to the external electrode 32.

Further, the lamp driving apparatus further includes a scanning signal generating part 30 that generates a scanning signal by a horizontal/vertical synchronization signal Hsync, Vsync supplied from the timing controller 36 and an auxiliary electrode driving part 37 that controls the combination and separation of the auxiliary electrode 35 in accordance with the scanning signal.

The liquid crystal display panel 42 has a liquid crystal between two glass substrates. The TFT formed at the crossings of the data lines and the gate lines of the liquid crystal display panel 42 supplies the data at the data line to a liquid crystal cell in response to a scan signal from the gate driver 46. A gate electrode and a source electrode of the TFT are respectively connected to the gate line and the data line, and a drain electrode thereof is connected to a pixel electrode of the liquid crystal cell.

The timing controller 36 re-aligns the digital video data supplied from a digital video card for each of red R, green G and blue B. The data RGB re-aligned by the timing controller 36 are supplied to the data driver 44. Further, the timing controller 36 generates a data control signal DDC and a gate control signal GDC based upon the horizontal/vertical synchronization signal Hsync, Vsync that it receives. The data control signals DDC include a dot clock DCLK, a source shift clock SSC, a source enable signal SOE, a polarity inversion signal POL, etc. and are supplied to the data driver 44. The gate control signals GDC includes a gate start pulse GSP, a gate shift clock GSC, a gate output enable GOE, etc. and are supplied to the gate driver 46. Further, the timing controller 36 supplies the horizontal/vertical synchronization signal Hsync, Vsync to the scanning signal generating part 30.

The data driver 44 samples the data in accordance with the data control signal DDC from the timing controller 36, latches the sampled data for each line, and converts the latched data into an analog gamma voltage using a gamma voltage supplier.

The gate driver 46 includes a shift register that sequentially generates the scan signal in response to the gate start pulse GSP among the gate control signals GDC from the timing controller 36 and a level shifter for shifting the voltage of the scan signal to a voltage level that is suitable for driving the liquid crystal cell.

The scanning signal generating part 30 generates a scanning signal composed of a high voltage and a low voltage according to the horizontal/vertical synchronization signal Hsync, Vsync supplied from the timing control 36. In the scanning signal, the high voltage means that the lamp is turned on, and the low voltage means that the lamp is turned off.

The auxiliary electrode driving part 37 controls the auxiliary electrode 35 to be sequentially combined with and removed from the external electrode 32 of each lamp 31 in accordance with the direction of the signal that is scanned to the liquid crystal cell in response to the scanning signal from the scanning signal generator 30.

The lamps 31 connected in parallel receive the current from the external electrode 32 through the common electrode 33 that receives a static current from the inverter 34. At this moment, if an electrode area of the external electrode 32 on one of the lamps 31 becomes larger, the set static current is condensed to flow to the external electrode 32 having the large area. This can be known by the following Mathematical Formulas 1, and 2.

$$C = \epsilon(A/d) \qquad \text{[Mathematical Formula 1]}$$

$$I = C(dv/dt) \qquad \text{[Mathematical Formula 2]}$$

In Mathematical Formulas 1, and 2, 'C' is a capacitance, 'A' is an electrode area and 'I' is a current. The capacitance is proportional to the area of the electrode when referring to Mathematical Formula 1, and the current is proportional to the capacitance when referring to Mathematical Formula 2. That is to say, the capacitance is increased as the area of the external electrode 32 is increased, and the size of the current is increased as the capacitance is increased. In other words, if the area of the external electrode 32 is increased, a larger capacitance is generated to increase the size of a tube current that is consumed at the same tube voltage.

Figure 7A:
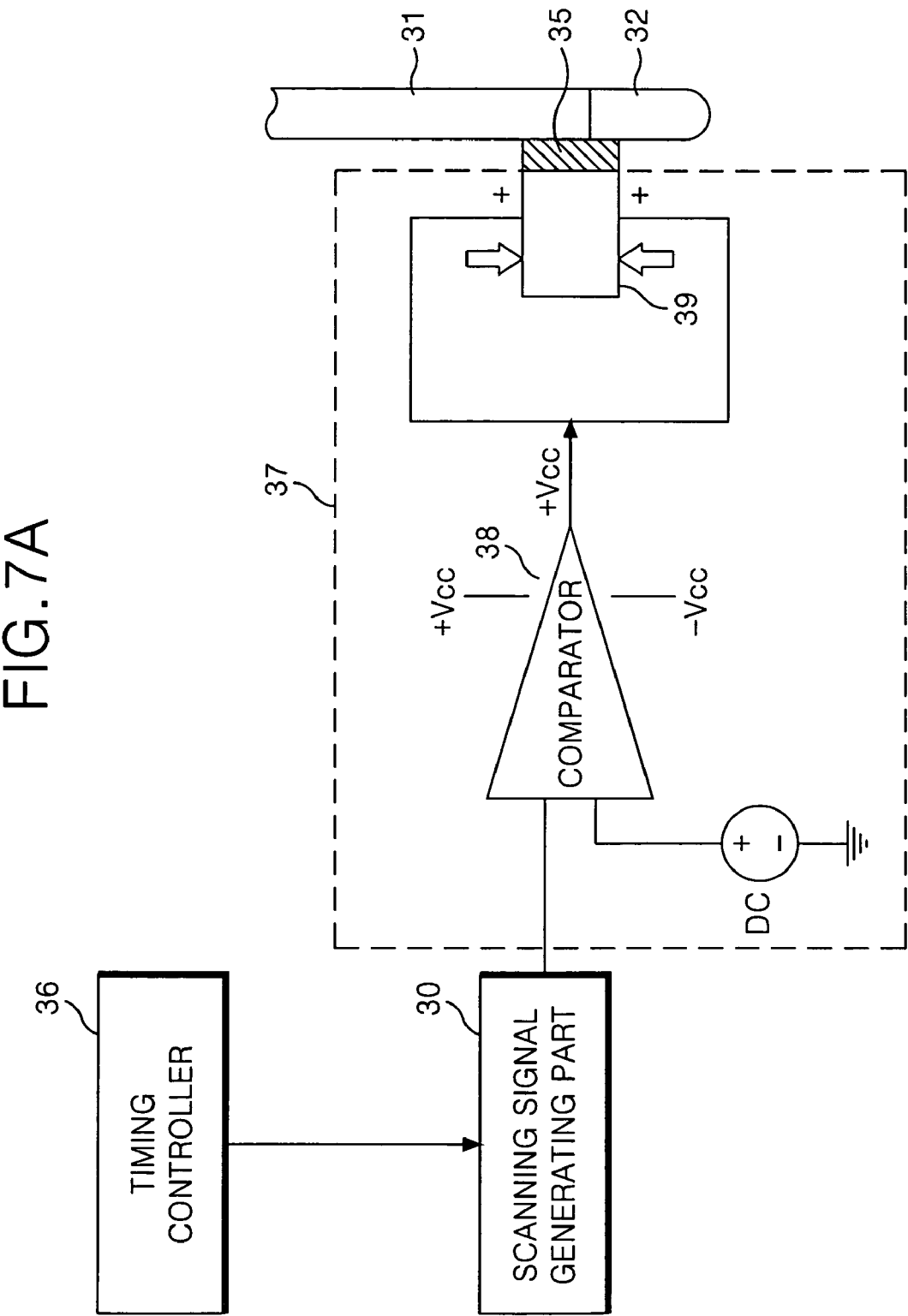
FIGS. 7A and 7B are diagrams representing a driver for an auxiliary electrode driver shown in FIG. 6.
Figure 7B:
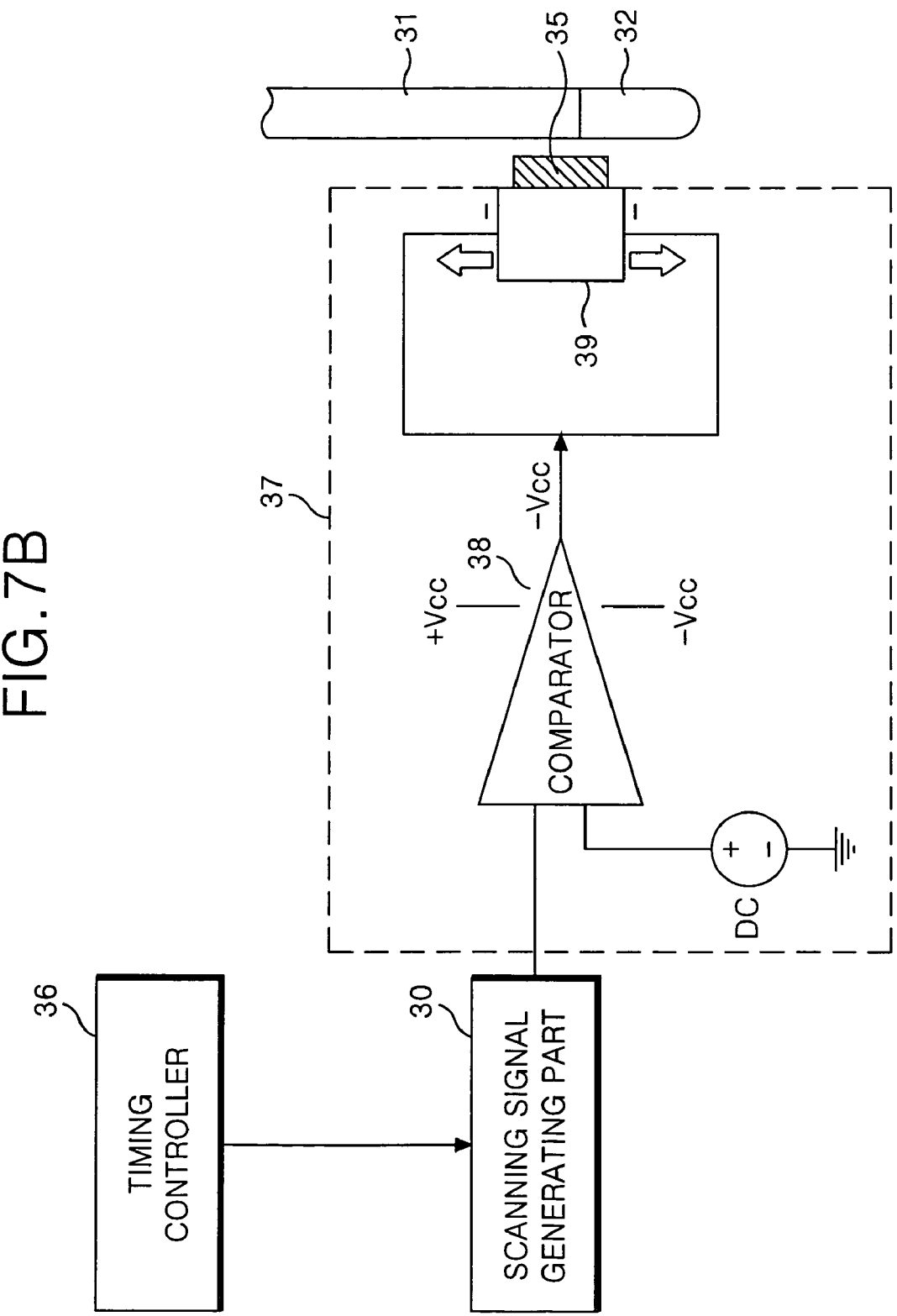

Accordingly, the area size of the external electrode 32 is adjusted to control the size of the tube current supplied to each lamp 31, thereby generating different brightness for each lamp 31. However, the external electrode 32 is fixed to the lamp 31 in a fixed size, thus the auxiliary electrode 35 is included for adjusting the area of the external electrode 32. The auxiliary electrode 35 is formed of a conductive material connected to the external electrode 32, and can be connected to and disconnect from the external electrode 32 by control of the auxiliary electrode driving part 37, as shown in FIGS. 7A and 7B. The auxiliary electrode 35 may be disposed at one end or both ends of the external electrode 32.

FIG. 7A is a diagram showing how that an auxiliary electrode 35 is connected to the external electrode 32 in the auxiliary electrode driving part 37, and FIG. 7B is a diagram showing how the auxiliary electrode 35 is disconnected from the external electrode 32 in the auxiliary electrode driving part 37.

Referring to FIGS. 7A and 7B, the auxiliary electrode driving part 37 includes a piezoelectric circuit which has a piezoelectric movable element 39 to which the auxiliary electrode 35 is adhered, and a comparator 38.

The comparator 38 receives a piezoelectric drive positive voltage +Vcc which supplies a positive (+) voltage to the piezoelectric circuit, a piezoelectric drive negative voltage −Vcc that supplies a negative (−) voltage to the piezoelectric circuit, and a reference voltage DC, and the comparator 38 receives the scanning signal from the scanning signal generating part 30. The comparator 38 supplies the piezoelectric drive positive voltage +Vcc to the piezoelectric circuit if the scanning signal is higher than the reference voltage DC, and the comparator 38 supplies the piezoelectric drive negative voltage −Vcc to the piezoelectric circuit if the scanning signal is lower than the reference voltage DC. The reference voltage DC is set to be between the high voltage and the low voltage of the scanning signal in size.

In FIG. 7A, the positive voltage (+) is applied to both ends of the piezoelectric movable element 39 to shrink the piezoelectric movable element 39 because the piezoelectric drive positive voltage +Vcc is supplied to the piezoelectric circuit, thereby causing the auxiliary electrode 35 connect to the external electrode 32. Further, in FIG. 7B, the negative voltage (−) is applied to both ends of the piezoelectric movable element 39 to expand the piezoelectric movable element 39 because the piezoelectric drive negative voltage −Vcc is supplied to the piezoelectric circuit, thereby causing the auxiliary electrode 35 to disconnect from the external electrode 32. The lamps 31 may be driven by being divided into a plurality of blocks, and in that case, the auxiliary electrode driving part 37 is included at each block of the lamps.

Figure 8:
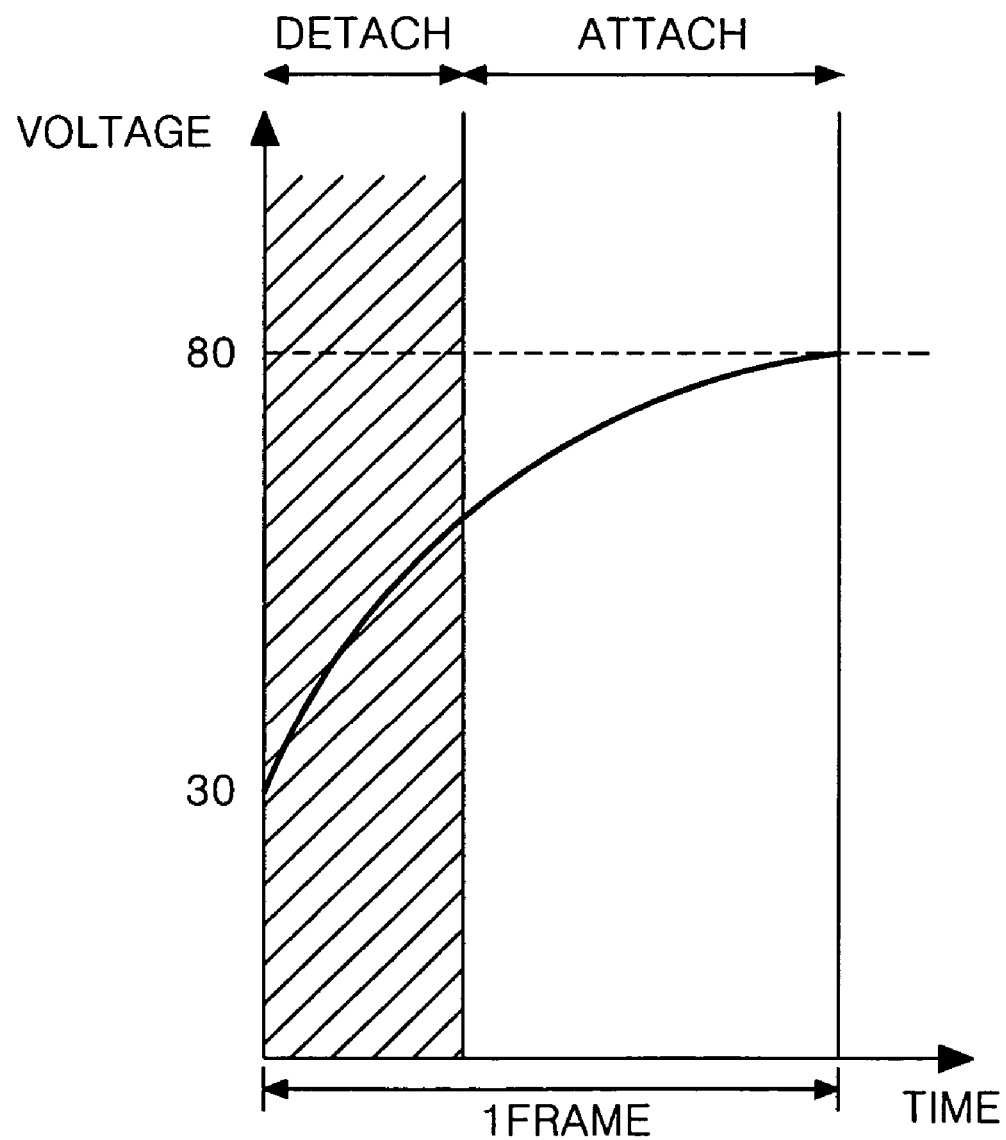
FIGS. 8 and 9 are diagrams representing a lamp driving method of a liquid crystal display device according to the present invention.
Figure 9:
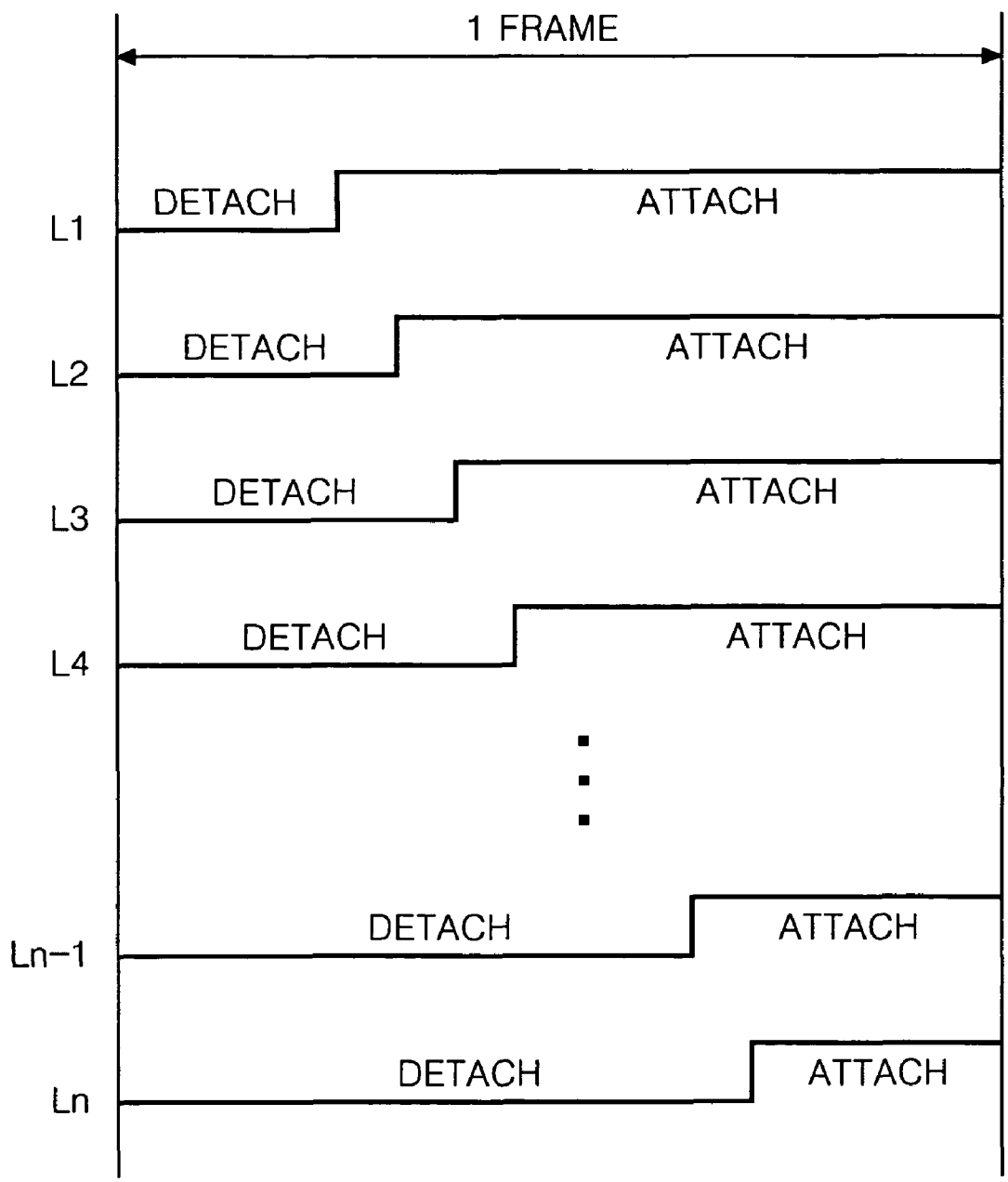

Referring to FIG. 8, if the driving voltage of the liquid crystal cell is 30V in the previous frame and the driving voltage of the current frame is 80V, the voltage slowly increases as shown in the diagram until it reaches the desired value. In this case, the auxiliary electrode 35 is disconnected for a fixed time and the auxiliary electrode 35 is connected for the remaining frame period. The time while the auxiliary electrode 35 is disconnected in one frame can be varied according to the type of the lamp and the liquid crystal display device. The lamp to which the auxiliary electrode 35 is connected by the auxiliary electrode driving part 37 produces a higher brightness than other lamps and the lamp where the auxiliary electrode 35 is disconnected has an effect of being turned off. The combination of the auxiliary electrode 35 is made in turn in order of the lamps, as shown in FIG. 9 and, if the lamps are driven for each block, the combination of the auxiliary electrodes 35 is made in order of the blocks. If the gate signal is sequentially supplied to each gate line in the liquid crystal display panel, the auxiliary electrode 35 is combined to the lamp corresponding to the gate line to which the gate signal is supplied, thus it is possible to finally obtain an effect where the lamps are sequentially turned on.

As described above, the lamp driving apparatus and method of the liquid crystal display device according to the present invention connects and disconnects the auxiliary electrode that is connected to the external electrode of the external electrode fluorescent lamp to sequentially control the brightness of the lamp, thereby making it possible to apply a scanning backlight driving.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A lamp driving apparatus of a liquid crystal display device, comprising:
    a plurality of lamps irradiating light to a liquid crystal display panel and including external electrodes;
    a common electrode connected to the external electrodes that supply a tube current to the lamps;
    auxiliary electrodes that are movable;
    an auxiliary electrode driving part sequentially connecting the auxiliary electrodes with and disconnecting the auxiliary electrode from the external electrodes in accordance with a scan direction of data to be displayed on the liquid crystal display panel;
    a scanning signal generating part that supplies a scanning signal to the auxiliary electrode driving part; and
    a timing controller that supplies a horizontal synchronization signal and a vertical synchronization signal to the scanning signal generator,
    wherein the auxiliary electrode driving part includes a comparator comparing a predetermined reference voltage with the scanning signal to selectively generate a piezoelectric drive positive voltage and a piezoelectric drive negative voltage in accordance with the comparison result and a piezoelectric movable element that contracts and expands in accordance with a piezoelectric drive positive voltage and a piezoelectric drive negative voltage from the comparator to drive the auxiliary electrode.

2. The lamp driving apparatus according to claim 1, wherein the auxiliary electrodes include a metal that is able to be connected to the external electrodes.

3. The lamp driving apparatus according to claim 1, wherein the lamps are divided into a plurality of blocks and are driven.

4. The lamp driving apparatus according to claim 3, wherein the auxiliary electrode driving part is disposed at each block.

5. The lamp driving apparatus according to claim 1, wherein the auxiliary electrode is connected to the external electrode to turn the lamp on by the contraction of the piezoelectric movable element when a positive voltage +Vcc is supplied to both ends of the piezoelectric movable element, and the auxiliary electrode is disconnected from the external electrode to turn the lamp off by the expansion of the piezoelectric movable element when a negative voltage −Vcc is supplied to both ends of the piezoelectric movable element.

6. A lamp driving method of a liquid crystal display device, comprising:
    installing auxiliary electrodes that are able to be connected to and disconnected from a plurality of external electrodes;
    irradiating light to a liquid crystal display panel by applying a tube current to a plurality of lamps through the external electrodes; and
    sequentially connecting the auxiliary electrodes to and disconnecting the auxiliary electrodes from the external electrodes by driving the auxiliary electrodes in conjunction with a scanning direction of the liquid crystal display panel,
    wherein the step of sequentially connecting the auxiliary electrodes to and disconnecting the auxiliary electrodes from the external electrodes includes generating a scanning signal that controls the sequential connecting and disconnecting operation of the auxiliary electrodes and driving the auxiliary electrodes in accordance with the scanning signal,
    wherein driving the auxiliary electrodes in accordance with the scanning signal includes comparing a predetermined reference voltage with the scanning signal and selectively generating a piezoelectric drive positive voltage and a piezoelectric drive negative voltage in accordance with the comparison result, turning the lamp on by contracting a piezoelectric movable element on the auxiliary electrode for the auxiliary electrode to be connected to the external electrode when the piezoelectric drive positive voltage is supplied to both ends of the piezoelectric movable element connected to the auxiliary electrode and turning the lamp off by expanding the piezoelectric movable element on the auxiliary electrode for the auxiliary electrode to be disconnected from the external electrode when the piezoelectric drive negative voltage is supplied to both ends of the piezoelectric movable element.

7. The lamp driving method according to claim 6, wherein the lamps are divided into a plurality of blocks and are turned on or off for each block by the piezoelectric drive positive voltage or the piezoelectric drive negative voltage.

8. A lamp driving apparatus of a liquid crystal display device, comprising:
    a plurality of lamps irradiating light to a liquid crystal display panel and including external electrodes;
    a common electrode connected to the external electrodes that supply a tube current to the lamps;
    auxiliary electrodes that are movable;
    an auxiliary electrode driving part sequentially connecting the auxiliary electrodes with and disconnecting the auxiliary electrode from the external electrodes in accordance with a scan direction of data to be displayed on the liquid crystal display panel;
    a scanning signal generating part that supplies a scanning signal to the auxiliary electrode driving part;
    a timing controller that supplies a horizontal synchronization signal and a vertical synchronization signal to the scanning signal generator,
    wherein the auxiliary electrode driving part includes:
    a comparator comparing a predetermined reference voltage with the scanning signal to selectively generate a piezoelectric drive positive voltage and a piezoelectric drive negative voltage in accordance with the comparison result; and
    a piezoelectric movable element that contracts and expands in accordance with a piezoelectric drive positive voltage and a piezoelectric drive negative voltage from the comparator to drive the auxiliary electrode,
    wherein the auxiliary electrodes include a metal that is able to be connected to the external electrodes.

9. The lamp driving apparatus according to claim 8, wherein the lamps are divided into a plurality of blocks and are driven.

10. The lamp driving apparatus according to claim 8, wherein the auxiliary electrode driving part is disposed at each block.

11. The lamp driving apparatus according to claim 8, wherein the auxiliary electrode is connected to the external electrode to turn the lamp on by the contraction of the piezoelectric movable element when a positive voltage +Vcc is supplied to both ends of the piezoelectric movable element, and the auxiliary electrode is disconnected from the external electrode to turn the lamp off by the expansion of the piezoelectric movable element when a negative voltage −Vcc is supplied to both ends of the piezoelectric movable element.

* * * * *